US009910160B2

(12) United States Patent
Geren et al.

(10) Patent No.: US 9,910,160 B2
(45) Date of Patent: Mar. 6, 2018

(54) DETECTING AND REMOVING SPOOFING SIGNALS

(71) Applicant: The Boeing Company, Chicago, IL (US)

(72) Inventors: William Preston Geren, Shoreline, WA (US); Anthony Goodson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 667 days.

(21) Appl. No.: 14/551,646

(22) Filed: Nov. 24, 2014

(65) Prior Publication Data

US 2016/0146944 A1     May 26, 2016

(51) Int. Cl.
    *G01S 19/21*     (2010.01)
    *H04K 3/00*     (2006.01)

(52) U.S. Cl.
    CPC .......... *G01S 19/215* (2013.01); *H04K 3/228* (2013.01); *H04K 3/65* (2013.01); *H04K 3/90* (2013.01); *H04K 2203/32* (2013.01)

(58) Field of Classification Search
    CPC ....... G01S 19/21; G01S 19/215; H04K 3/228; H04K 3/65; H04K 3/90
    USPC .................................................. 342/357.59
    See application file for complete search history.

(56) References Cited

U.S. PATENT DOCUMENTS

| | | | | |
|---|---|---|---|---|
| 5,557,284 A | * | 9/1996 | Hartman | G01S 19/215 342/352 |
| 2002/0197958 A1 | * | 12/2002 | Collins | H04B 7/18513 455/63.1 |
| 2004/0127230 A1 | * | 7/2004 | Bevan | H04W 64/00 455/456.5 |
| 2009/0054026 A1 | * | 2/2009 | Miller | H04B 1/123 455/266 |
| 2011/0110400 A1 | * | 5/2011 | Sutharsan | H04B 1/7107 375/148 |
| 2011/0287779 A1 | * | 11/2011 | Harper | G01S 19/03 455/456.1 |
| 2012/0196591 A1 | * | 8/2012 | O'Keeffe | H01Q 3/2605 455/427 |
| 2013/0002477 A1 | | 1/2013 | Dehnie et al. | |
| 2013/0106645 A1 | * | 5/2013 | Goodson | G01S 13/003 342/29 |

(Continued)

FOREIGN PATENT DOCUMENTS

JP      2013250271 A      12/2013

OTHER PUBLICATIONS

UK Patent Office; Office Action for GB Patent Application No. GB1520316.9 dated May 6, 2016, 6 Pages.

*Primary Examiner* — Harry K Liu
(74) *Attorney, Agent, or Firm* — Charles L. Moore; Moore & Van Allen PLLC

(57) ABSTRACT

A method for detecting and removing spoofing signals may include receiving, by a navigation or communications device, a radio frequency (RF) signal and performing an anti-spoofing assessment to detect a presence of a spoofing signal associated with the RF signal. The method may additionally include generating a replica of the spoofing signal in response to the spoofing signal being detected and subtracting the replica of the spoofing signal from the RF signal to provide a residual non-spoofed signal. The method may further include decoding the residual non-spoofed signal by the navigation or communications device.

20 Claims, 13 Drawing Sheets

(56) References Cited

U.S. PATENT DOCUMENTS

2014/0035783 A1 2/2014 Contarino et al.
2014/0111378 A1 4/2014 Kim et al.
2014/0247186 A1 9/2014 Daneshmand et al.
2015/0244450 A1* 8/2015 Wajcer ............... H04B 7/15585
　　　　　　　　　　　　　　　　　　375/214

* cited by examiner

DETECTING AND REMOVING SPOOFING SIGNALS

FIELD

The present disclosure relates to communications, navigation, communications devices and navigation devices, and more particularly to a method and system for detecting and removing spoofing communications and navigation signals from a received signal or signals.

BACKGROUND

Spoofing communications signals or navigation signals involves broadcasting counterfeit or false communications or navigation signals, such as global positioning system (GPS) navigation signals or other type navigation signals in an attempt to deceive a communications or navigation device or receiver. The spoofed or spoofing signals may be structured to resemble expected communications signals or normal navigation signals. Spoofing may also involve rebroadcasting genuine signals captured elsewhere or at a different time. These spoofed signals may be modified or altered in such a way as to provide false information or data or to cause a navigation device or receiver to estimate its position to be somewhere other than where the navigation device is actually located. One common form of a GPS spoofing or navigation spoofing attack, commonly referred to as a carry-over attack, begins by broadcasting signals synchronized with the genuine signals received by a target receiver. The power of the counterfeit signals is then gradually increased and the navigation device is drawn away from the genuine signals.

SUMMARY

In accordance with an embodiment, a method for detecting and removing spoofing signals may include receiving, by a navigation or communications device, a radio frequency (RF) signal and performing an anti-spoofing assessment to detect a presence of a spoofing signal associated with the RF signal. The method may additionally include generating a replica of the spoofing signal in response to the spoofing signal being detected and subtracting the replica of the spoofing signal from the RF signal to provide a residual non-spoofed signal. The method may further include decoding the residual non-spoofed signal by the navigation or communications device.

In accordance with another embodiment, a method for detecting and removing a spoofing signal may include receiving, by a navigation device, an RF signal from each of a plurality of navigation satellites. Each RF signal may include a navigation code. The navigation code may be a coarse acquisition pseudorandom noise code sequence (C/A PRN) or other navigation code sequence. The method may also include performing, by the navigation device, an anti-spoofing assessment to detect a presence of a spoofing signal of at least one of the RF signals. The method may additionally include generating, by the navigation device, a replica of the spoofing signal in response to detecting the spoofing signal of at least one of the RF signals. The method may also include subtracting, by the navigation device, the replica of the spoofing signal from the RF signals received from each of the plurality of navigation satellites to provide a residual non-spoofed signal. The method may further include decoding, by the navigation device, the residual non-spoofed signal.

In some embodiments of the present invention in combination with any of the above embodiments, performing the anti-spoofing assessment may include determining a measured angle of arrival of the RF signal by receiving the RF signal using an array of antennas and determining a predicted angle of arrival of the RF signal based at least on a predicted location of a source of the RF signal relative to the navigation or communications device. The anti-spoofing assessment may also include comparing the measured angle of arrival of the RF signal and the predicted angle of arrival of the RF signal. The anti-spoofing assessment may additionally include detecting the spoofing signal in response to the measured angle of arrival and the predicted angle of arrival not being approximately equal each other.

In some other embodiments of the present invention and in combination with any of the above embodiments, receiving the RF signal may include receiving a plurality of RF signals. Each RF signal may be received from a respective one of a plurality of navigation satellites and each RF signal may include a navigation code sequence. The navigation code sequence may include a coarse acquisition pseudorandom noise code sequence (C/A PRN). Generating the replica of the spoofing signal may include removing the Doppler shift from each RF signal; adjusting the time lag of each RF signal; correlating the navigation code sequences from each of the plurality of navigation satellites; and generating a cancellation waveform for the spoofing signal. The spoofing signal may be a counterfeit signal corresponding to the RF signal from a particular navigation satellite being spoofed. The cancellation waveform for the spoofing signal may include a product of an on-board replica of the navigation code sequence of the particular GPS satellite being spoofed and a normalizing projection factor. Generating the replica of the spoofing signal may additionally include performing an iterative process to remove any additional spoofing signals and any spoofing signals arriving via multipath.

In accordance with a further embodiment, a navigation/communications device may include a signal conditioning and digitization module configured to receive an RF signal and condition and digitize the RF signal. The navigation/communications device may also include a signal processor for processing the digitized RF signal. The navigation/communications device may additionally include a spoofing detector configured for performing an anti-spoofing assessment to detect a presence of a spoofing signal associated with the digitized RF signal. The navigation/communications device may further include a spoofing signal removal module. The spoofing signal removal module may be configured to generate a replica of the spoofing signal in response to the spoofing signal being detected and to subtract the replica of the spoofing signal from the digitized RF signal to provide a residual non-spoofed signal. The signal processor may be further configured to decode the residual non-spoofed signal.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1:
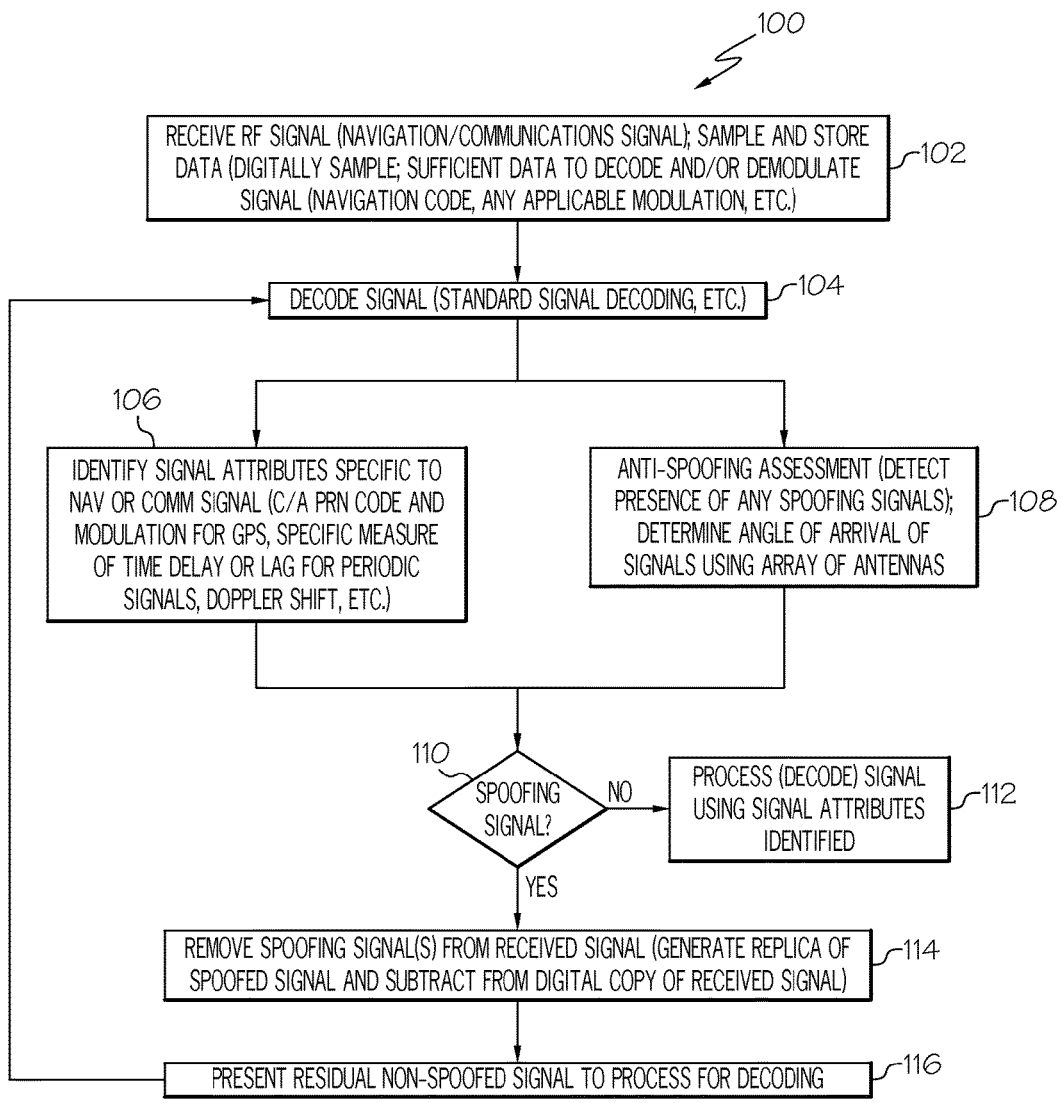
FIG. 1 is a flow chart of an example of a method for detecting and removing a spoofing signal in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is a flow chart of an example of a method 100 for detecting and removing a spoofing signal in accordance with an embodiment of the present disclosure. In block 102, a radio frequency (RF) signal may be received by a device configured to receive RF signals. The device may be a navigation device, such as a global positioning system (GPS) receiver, communications device, or combination navigation and communications device. Accordingly, the RF signal may be a navigation signal or communications signal. The RF signal or data contained in the RF signal may be digitally sampled and stored, at least temporarily, in a storage device of the navigation and/or communications device. A sufficient amount of data needs to be sampled and stored to permit decoding and/or demodulating the navigation or communications signal. Expressed another way, the sampled RF signal or set of samples of the RF signal need to be sufficiently long to allow the core attributes of the RF signal to be identified. For example, in the case of a navigation signal the complete coarse acquisition pseudorandom noise code sequence (C/A PRN) or similar navigation code and applicable modulation for the C/A PRN or similar navigation code needs to be able to be determined. Furthering the C/A PRN example, 20 milliseconds will capture 20 instances of the CA/PRN code, and 30 seconds will capture one frame of the navigation message. Storing 20 milliseconds of the C/A PRN is sufficient to de-spoof the C/A PRN codes.

As used herein a navigation satellite may be a GPS satellite or any type of navigation satellite and navigation code or code sequence may be a C/A PRN or any type of code or code sequence unique to a particular navigation satellite and transmitted by the particular navigation satellite for purposes of navigation or determining a geographic location by a receiving device. While the examples described herein may refer to a GPS satellite and C/A PRN from a GPS satellite, the features of the present disclosure may be applicable to any type of navigation satellite and navigation code sequence transmitted by a navigation satellite.

In block 104, the RF signal may be decoded. The decoding may be standard signal decoding similar to that commonly used in decoding navigation or communications signals.

In block 106, signal attributes of the RF signal or attributes specific to the navigation signal or communications signal received may be identified or determined. For example, in the case of a navigation signal or GPS signal, the navigation code or C/A PRN and modulation may be identified. An example of a modulation sequence for a navigation code or C/A PRN is described with reference to FIG. 2 herein. Other attributes that may be identified may include but are not necessarily limited to a specific measure of time delay or lag for periodic signals and Doppler shift. For each navigation code or C/A PRN received, a time lag in relation to the navigation code or C/A PRN reference used and the Doppler shift of the received signal may be determined. Key characteristics of a received navigation or GPS signal are the navigation code or C/A PRN, the time of arrival of that code relative to a fiducial time, a signal modulation (for navigation signals), and a Doppler shift associated with the line-of-sight to the satellite (or spoofing source). An example of determining an offset or time lag between a received navigation signal and a reference navigation signal is described herein with reference to FIGS. 3A-3C. An example of a method for determining a Doppler shift associated with the line-of-sight to the satellite (or spoofing source) is described herein with reference to FIG. 4. Whether a signal is a real signal or a spoofed signal may be characterized by these attributes.

Figure 2:
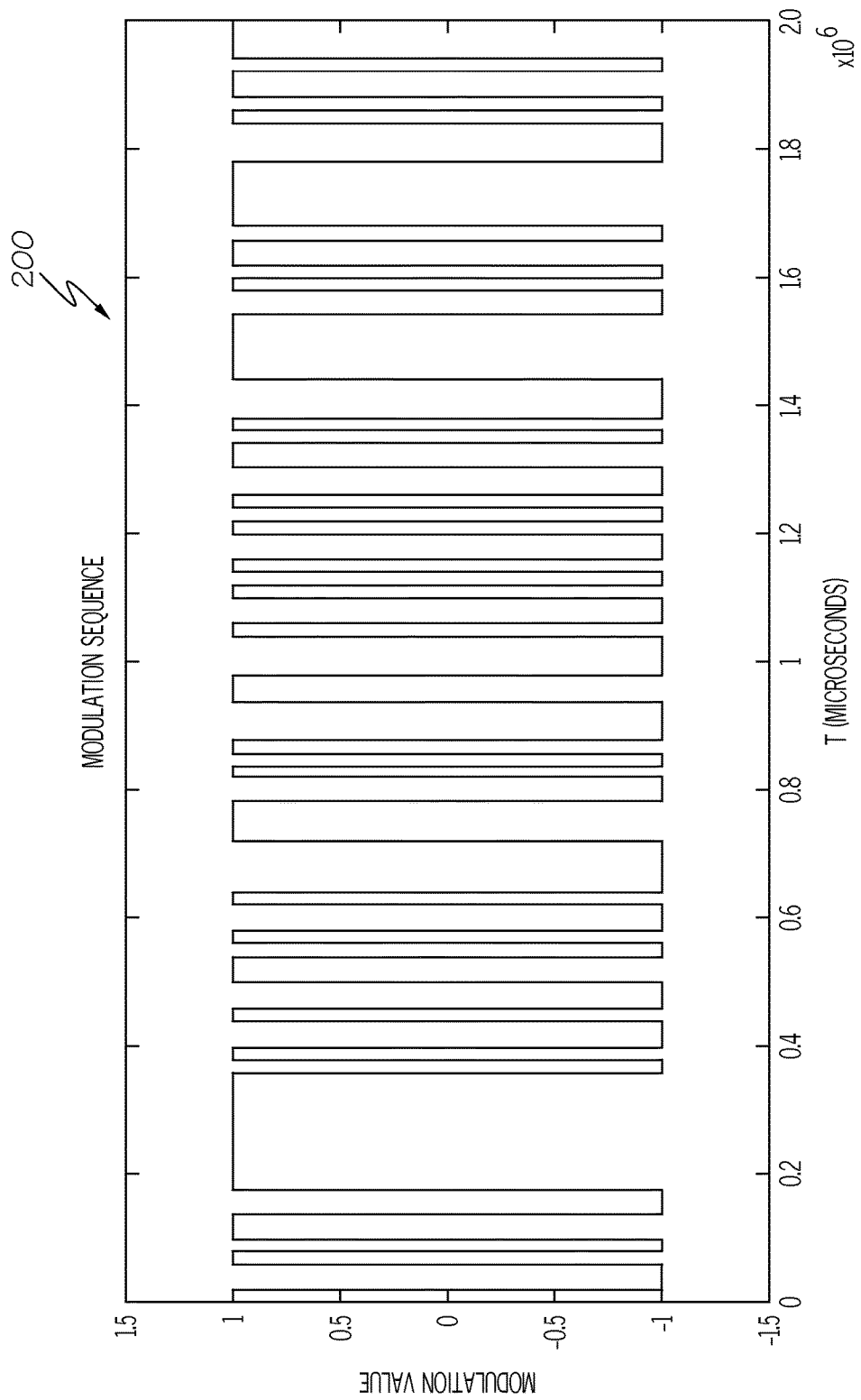
FIG. 2 is an illustration of an example of a modulation sequence for a C/A PRN in accordance with an embodiment.

Referring also to FIG. 2, FIG. 2 is an illustration of an example of a modulation sequence 200 for a C/A PRN in accordance with an embodiment. A C/A PRN may be modulated by multiplying the C/A PRN by a predetermined modulation sequence, such as that illustrated in FIG. 2. The data rate for the modulation of a code for navigation signals is 50 Hertz. Therefore, each of the "bits" in modulation schemes contains 20 replications of the C/A PRN (each 1 millisecond long). When a bit changes, the sign of the C/A PRN code changes. The change in the C/A PRN may be measured as phase.

Figure 3A:
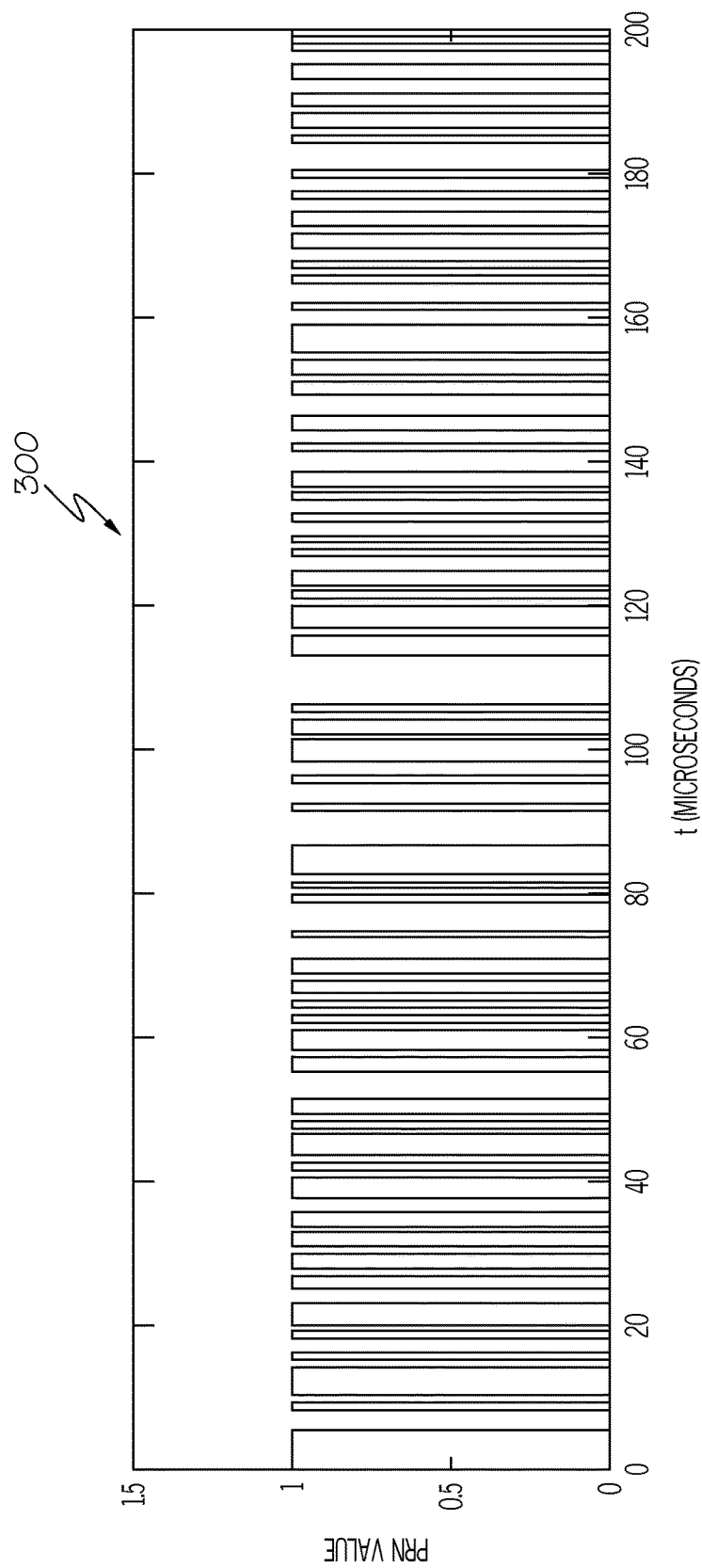
FIG. 3A shows a segment of an exemplary coarse acquisition pseudorandom noise (C/A PRN) reference code sequence or signal from a GPS satellite in accordance with an embodiment of the present disclosure.
Figure 3B:
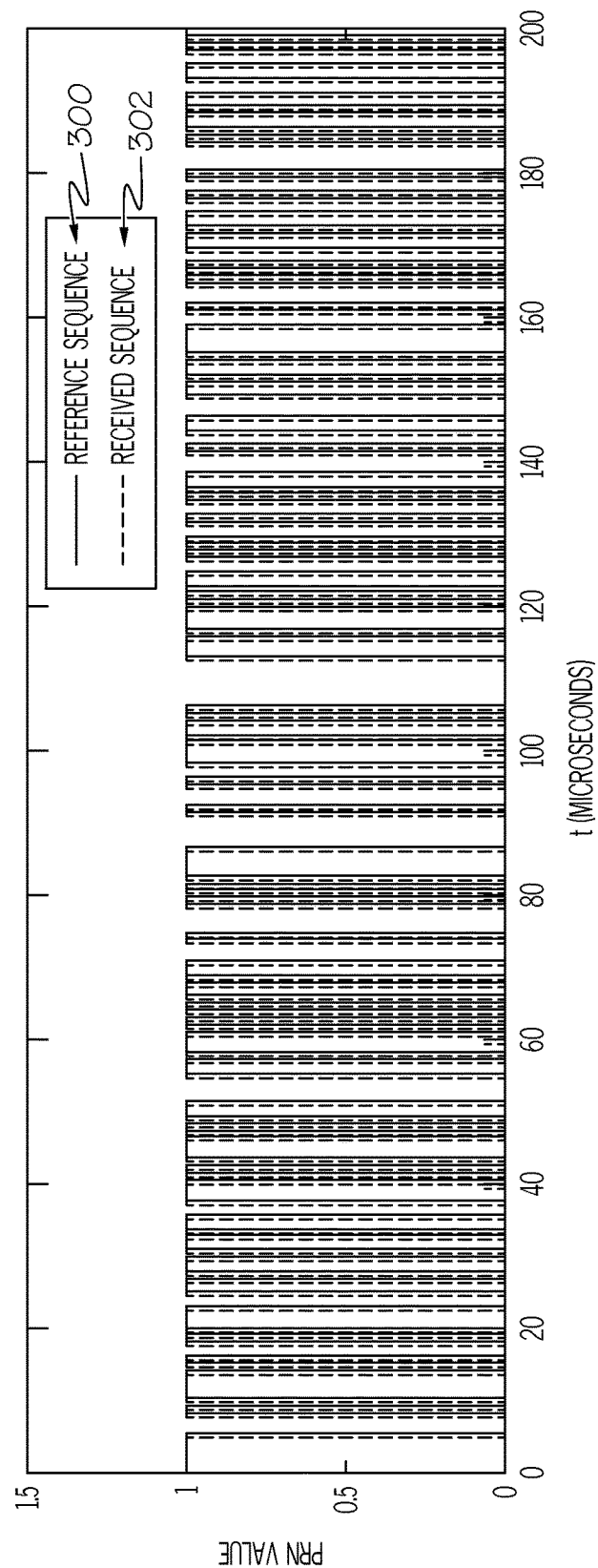
FIG. 3B shows the exemplary C/A PRN reference code sequence superimposed on a received C/A PRN sequence or signal from the same GPS satellite in accordance with an embodiment of the present disclosure.
Figure 3C:
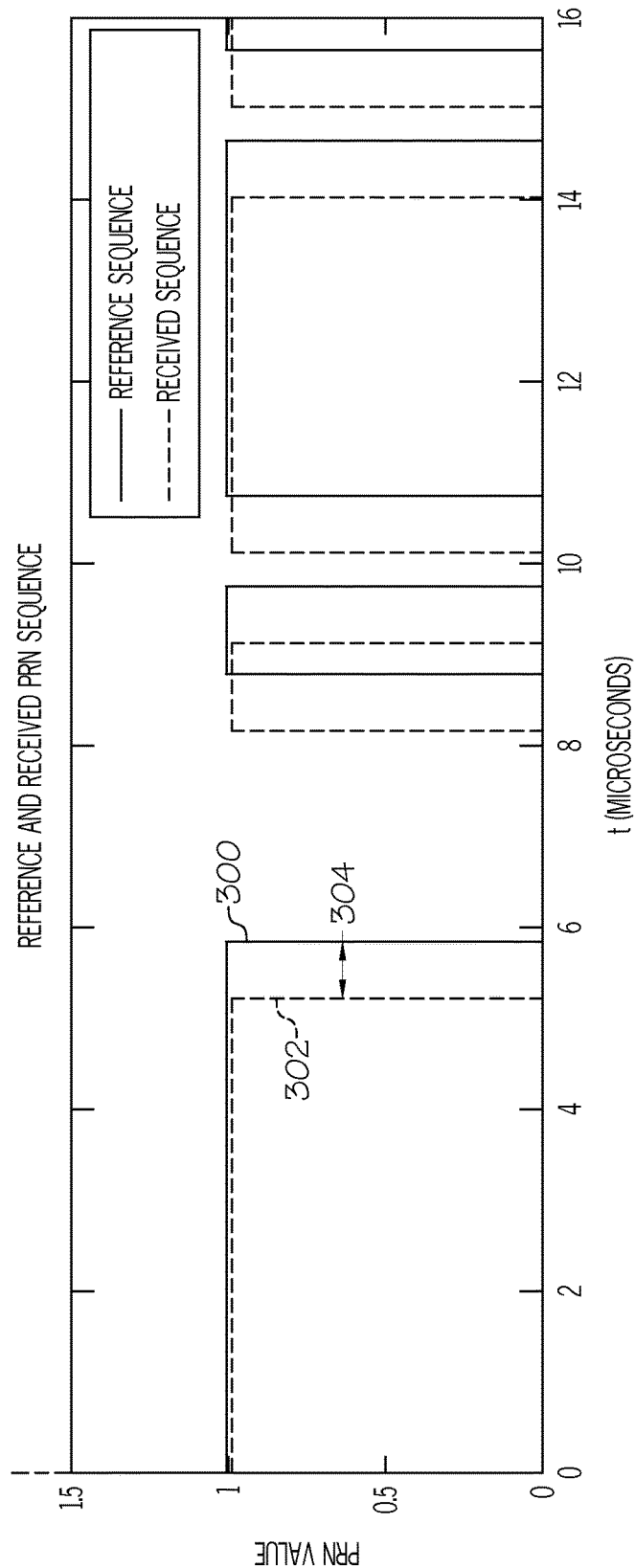
FIG. 3C is a detailed view of the C/A PRN sequences in FIG. 3B illustrating an offset between the reference C/A PRN sequence and the received C/A PRN sequence.

Referring also to FIGS. 3A-3C, FIG. 3A shows a segment of an exemplary C/A pseudorandom noise (C/A PRN) reference code sequence 300 for a C/A PRN from a particular GPS satellite in accordance with an embodiment of the present disclosure. FIG. 3B shows the exemplary C/A PRN reference code sequence 300 of FIG. 3A superimposed on a received C/A PRN sequence 302 or signal from the same GPS satellite in accordance with an embodiment of the present disclosure. The C/A PRN reference code sequence 300 is illustrated by a solid line waveform in FIG. 3B and the received C/A PRN sequence 302 is shown by the broken or chain line in FIG. 3B. As shown in FIG. 3B, the received C/A PRN sequence 302 may be offset from the C/A PRN reference code 302 of a particular navigation or GPS satellite. The C/A PRN is encoded at a bit rate of 1.023 megahertz (MHz), and is one millisecond (or 1023 bits) long. FIG. 3C is a detailed view of the C/A PRN sequences 300 and 302 in FIG. 3B illustrating the offset 304 between the reference C/A PRN sequence 300 and the received C/A PRN sequence 302. FIG. 3C is a detailed view of the first 16 microseconds of the waveforms shown in FIG. 3B. As illustrated by FIG. 3C, the offset in time between the reference C/A PRN 300 and received C/A PRN 302 may be measured or determined. The offset in time corresponds to the time delay or time lag signal attribute between the reference C/A PRN 300 and the received C/A PRN 302.

Figure 4:
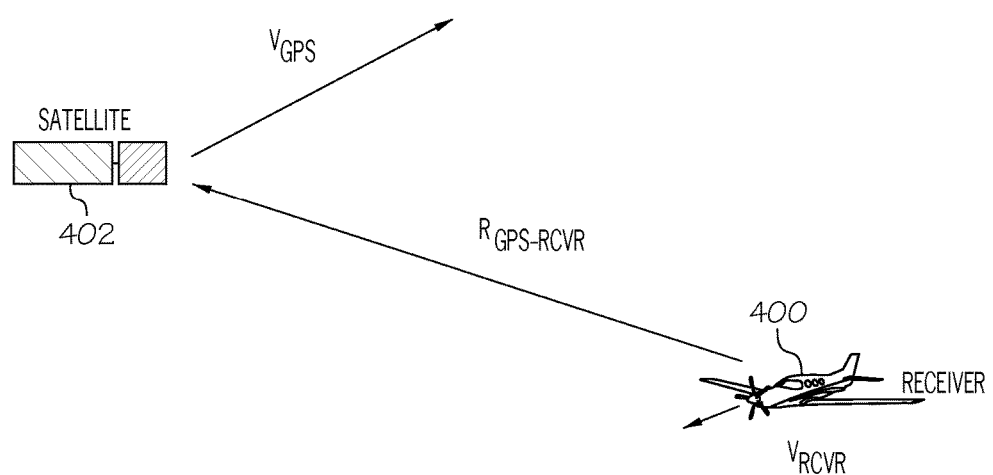
FIG. 4 is an illustration of an example for determining a Doppler shift of a navigation signal or GPS signal in accordance with an embodiment of the present disclosure.

Referring also to FIG. 4, FIG. 4 is an illustration of an example of a method for determining a Doppler shift of a navigation signal or GPS signal in accordance with an embodiment of the present disclosure. The relative motion between a receiver 400 and a navigation satellite 402 determines a frequency shift based on a standard Doppler calculation which is known in the art. For example, Equation 1 will provide a line-of-sight vector velocity ($V_{LoS}$) of the receiver 400 relative to the GPS satellite 402:

$$V_{LoS} = \left(\frac{(V_{RCVR} - V_{GPS}) \cdot R_{GPS-RCVR}}{|R_{GPS-RCVR}|}\right) \quad \text{Equation 1}$$

Where $V_{RCVR}$ is the vector velocity of the receiver 400, $V_{GPS}$ is the vector velocity of the navigation or GPS satellite 402, $R_{RGPS-RCVR}$ is the vector range between the receiver 400 and the GPS satellite 402. The signal received by the receiver 400 from the navigation satellite 402 will be shifted in frequency ($\Delta F_{Doppler}$) by the Doppler shift as represented by Equation 2:

$$\Delta F_{Doppler} = \left(\frac{V_{LoS}}{c}\right) F_{Carrier} \quad \text{Equation 2}$$

Where c is the speed of light or velocity of the navigation or GPS signal in free space and $F_{Carrier}$ is the carrier frequency of the signal. For example, the carrier frequency for GPS satellite L1 is 1.575 Gigahertz. A spoofed signal may include a spoofed version of the Doppler shift by shifting the spoofed or spoofing signal before transmission from the spoofing source.

Referring back to FIG. 1, in block 108, an anti-spoofing assessment may be performed to detect a presence of a spoofing signal associated with the RF signal. One exemplary technique for performing an anti-spoofing assessment to detect a presence of a spoofing signal may be to determine an angle of arrival of each RF signal using an array of antennas. An example of a method for detecting a spoofing signal by determining an angle of arrival of each RF signal using an array of antennas will be described in more detail with reference to FIG. 5. Briefly, a measured angle of arrival of each RF signal may be determined by receiving the RF signals using an array of antennas. A predicted angle of arrival of the RF signal may be determined based at least on a predicted location of a source of the RF signal relative to the navigation or communications device or a location of the navigation or communications device. The measured angle of arrival of the RF signal and the predicted angle of arrival of the RF signal may be compared. The spoofing signal may be detected in response to the measured angle of arrival and the predicted angle of arrival not being approximately equal each other. In other words, the RF signal may be determined to be a spoofing signal in response to the measured angle of arrival and the predicted angle of arrival not being approximately equal each other. Alternatively, the spoofing signal may be detected by a difference between the measured angle of arrival of the RF signal and the predicted angle of arrival of the RF signal exceeding a preset threshold. For example the difference between the angles of arrival exceeding a threshold of about 5 degrees may indicate that the received RF signal may be likely a spoofing signal.

In block 110, a determination may be made if the RF signal or signals includes a spoofing signal. If a determination is made in block 110 that the RF signal is not a spoofing signal or does not include a spoofing signal, the method 100 may advance to block 112. In block 112, the RF signal or signals may be processed using the signal attributes previously identified. The RF signal may be processed by decoding the RF signal using the attributes previously determined. For example, if the RF signal is a navigation signal or navigation signals, the navigation signals may be processed or decoded similar to that known in the art to determine the geographic location of the navigation device that received the RF signals.

If a determination is made in block 110 that the RF signal or RF signals include a spoofing signal or signals, the method 100 may advance to block 114. In block 114, the spoofing signal or signals may be removed from the received RF signal for signals. An example of a method for removing a spoofing signal or signals from a received RF signal or signals will be described in more detail with reference to FIGS. 7A and 7B. In accordance with an exemplary embodiment, a replica of the spoofed signal may be generated and subtracted from the received signal or signals. The replica of the spoofed or spoofing signal may be generated and subtracted from a digital copy of the received RF signal which was digitally sampled and stored as previously described.

In block 116, a residual non-spoofed signal may be presented for processing or decoding. The non-spoofed signal may be returned to block 104 and the non-spoofed signal may be decoded or processed similar to that known in the art. The non-spoofed signal may be decoded or processed to provide a true communications or navigation signal for determining a true location of the device or system that receives the RF signal or signals.

Figure 5:
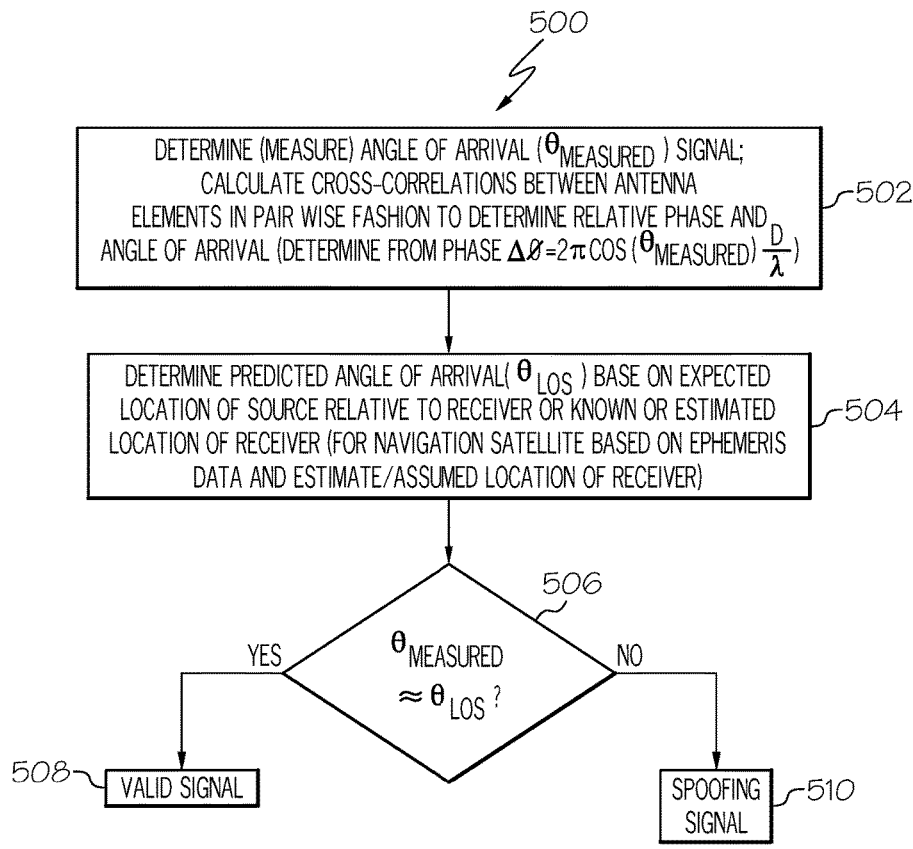
FIG. 5 is a flow chart of an example of a method for detecting a presence of a spoofing signal in accordance with an embodiment of the present disclosure.
Figure 6:
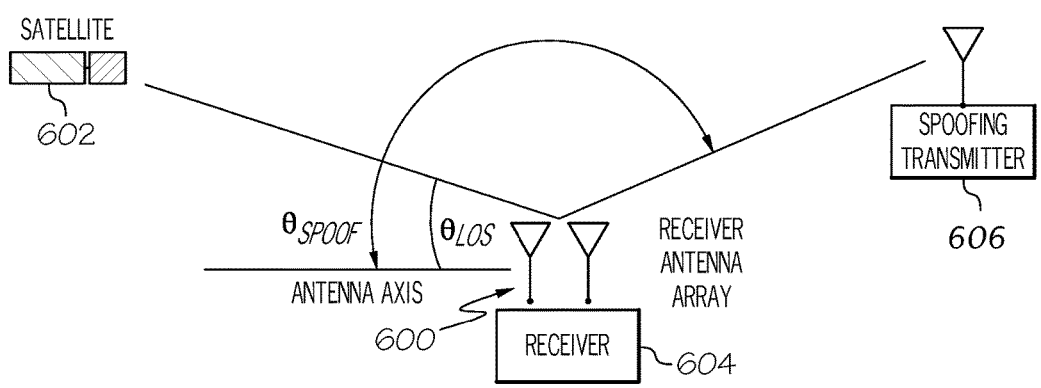
FIG. 6 is an illustration of an exemplary method for detecting a spoofing signal by comparing a measured angle of arrival of a navigation signal or GPS signal from a navigation satellite and a predicted angle of arrival based on ephemeris data for the particular navigation satellite and an estimated or assumed location of a receiver in accordance with an embodiment of the present disclosure.

FIG. 5 is a flow chart of an example of a method 500 for detecting a presence of a spoofing signal in accordance with an embodiment of the present disclosure. The method 500 may be used for the anti-spoofing assessment in block 108 of FIG. 1. In block 502, a measured angle of arrival ($\theta_{Measured}$) of the RF signal or each RF signal of a plurality of signals may be determined using an array of antennas at the receiver similar to the receiver array of antennas 600 as illustrated in FIG. 6. A cross-correlation may be calculated or determined between the antennas or antenna elements of the array in a pair wise fashion to determine a relative phase and angle of arrival of the RF signal or signals. Each antenna element incorporates a relative phase factor that depends on the angle of arrival or a family of angles of arrival depending on antenna spacing or spacing between the antenna elements. By calculating or determining the cross-correlation between the antenna elements in a pairwise fashion one can compute the relative phases and obtain the angle of arrival. The cross correlation calculation between the time dependent data from two antennas (x0 and x1) may be described as Equation 3:

$$x_{x-corr} = \sum_{t} x_0(t) \cdot x_1'(t) = |x_{x-corr}| \cdot e^{i\Delta\phi_{01}} \quad \text{Equation 3}$$

Where $\Delta\phi_{01}$ is the phase difference between the signal due to the angle of arrival from the transmitter.

The phase may be determined based on Equation 4:

$$\Delta\phi = 2\pi\cos(\theta_{Measured})\frac{D}{\lambda} \quad \text{Equation 4}$$

Where D is the spacing between antenna elements similar to that illustrated in FIG. 6 and $\lambda$ is the wavelength of the carrier signal, such as the carrier signal for a GPS signal or C/A PRN.

In block 504, a predicted angle of arrival or predicted line-of-sight angle of arrival ($\theta_{LOS}$) may be determined based on an expected location of a source of the RF signal relative to a receiver or based on the expected location of the source of the RF signal and a known or estimated location of the receiver.

In block 506, a determination may be made if the measured angle of arrival ($\theta_{Measured}$) is approximately equal the predicted angle of arrival ($\theta_{LOS}$). If the measured and predicted angles of arrival are approximately equal, the received RF signal may be determined to be a valid signal in block 508. If the measured and predicted angles of arrival are not approximately equal, the received RF signal may be determined to be a spoofing signal in block 510. Alternatively, in block 506, a determination may be made if a difference between the measured angle of arrival and the predicted angle of arrival exceed a preset threshold. For example, if the difference between the measured angle of arrival and the predicted angle of arrival exceeds about 5 degrees, the received RF signal may be determined to be a spoofing signal.

Referring also to FIG. 6, FIG. 6 is an illustration the method 500 for detecting a spoofing signal by comparing a measured angle of arrival of a navigation signal or GPS signal from a navigation satellite 602 and a predicted angle of arrival based on ephemeris data for the particular navigation satellite 602 and an estimated or assumed location of the receiver 604 in accordance with an embodiment of the present disclosure. As described with reference to block 502 of FIG. 5, a measured angle of arrival ($\theta_{Measured}$) using the array of antennas 600 may be determined. In the example illustrated in FIG. 6, the measured angle of arrival ($\theta_{Measured}$) will be equal the angle of arrival from a spoofing transmitter 606 ($\theta_{Spoof}$). The predicted angle of arrival or predicted line-of-sight angle of arrival ($\theta_{LOS}$) of the navigation signal from the navigation satellite 602 may be determined from the ephemeris data for the particular navigation satellite. As described in more detail with reference to FIG. 10 a database of satellite ephemeris data may be associated with the receiver 604. Because the measured angle of arrival ($\theta_{Spoof}$) and the predicted angle of arrival ($\theta_{LOS}$) are not approximately equal, the received RF signal is determined to be a spoofing signal and will be subtracted or removed from the other received signals similar to that described with reference to FIGS. 7A and 7B. This anti-spoofing approach requires that the receiver 604 or system "boot-strap" in a known location at a known time.

Figure 7A:
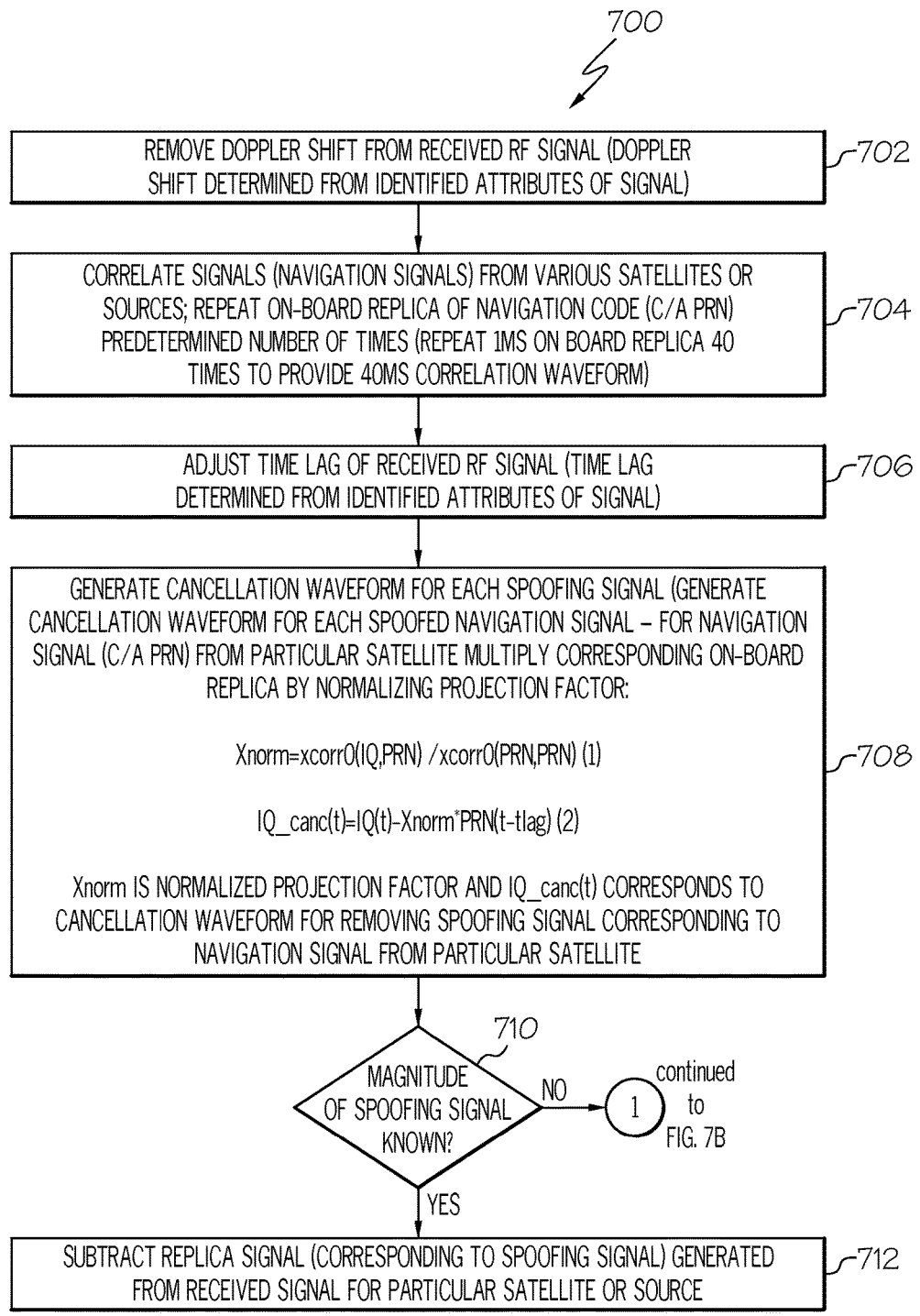
FIGS. 7A and 7B (collectively FIG. 7) are a flow chart of an exemplary method for removing a spoofing signal from received signals in accordance with an embodiment of the present disclosure.
Figure 7B:
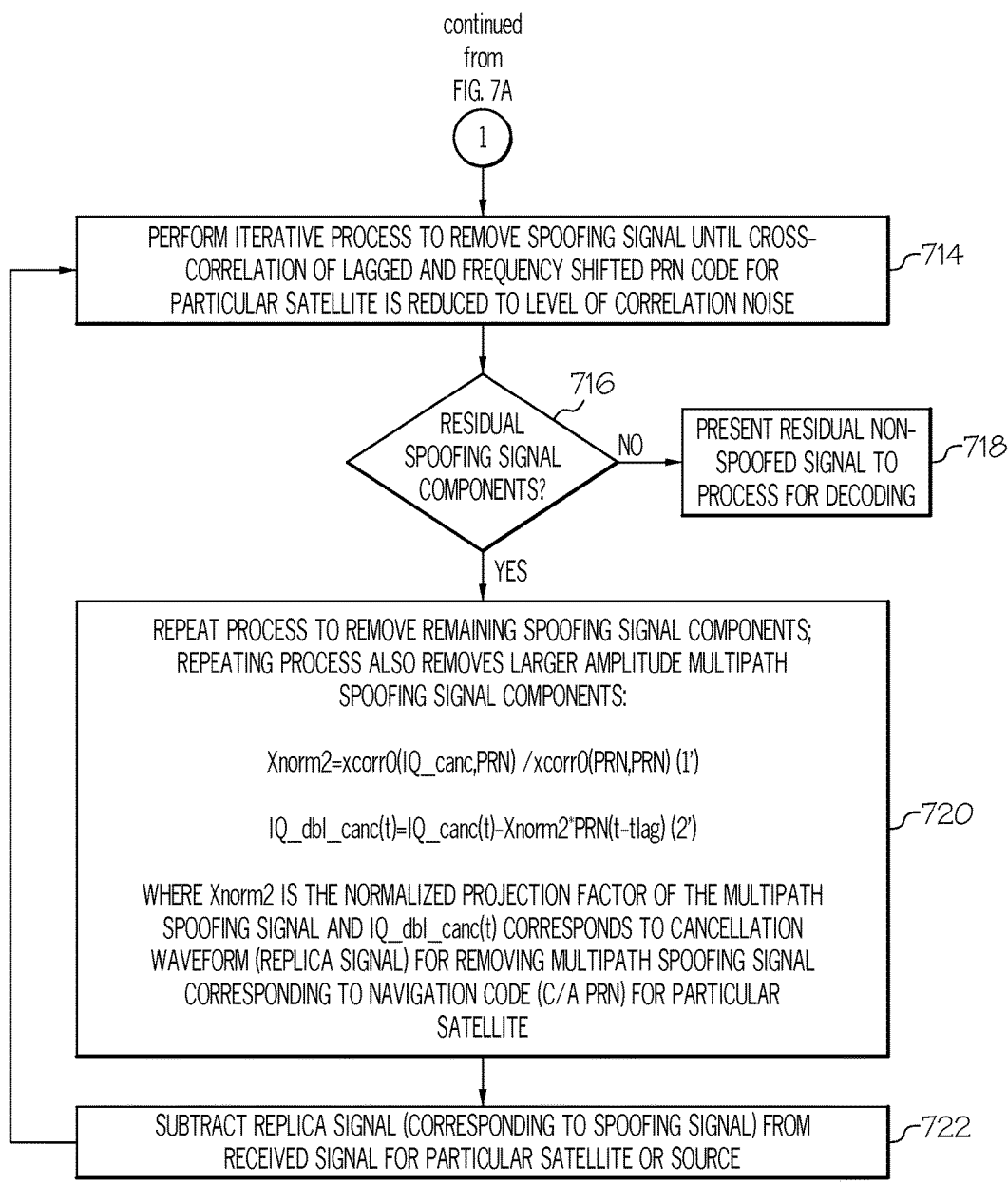
Figure 8:
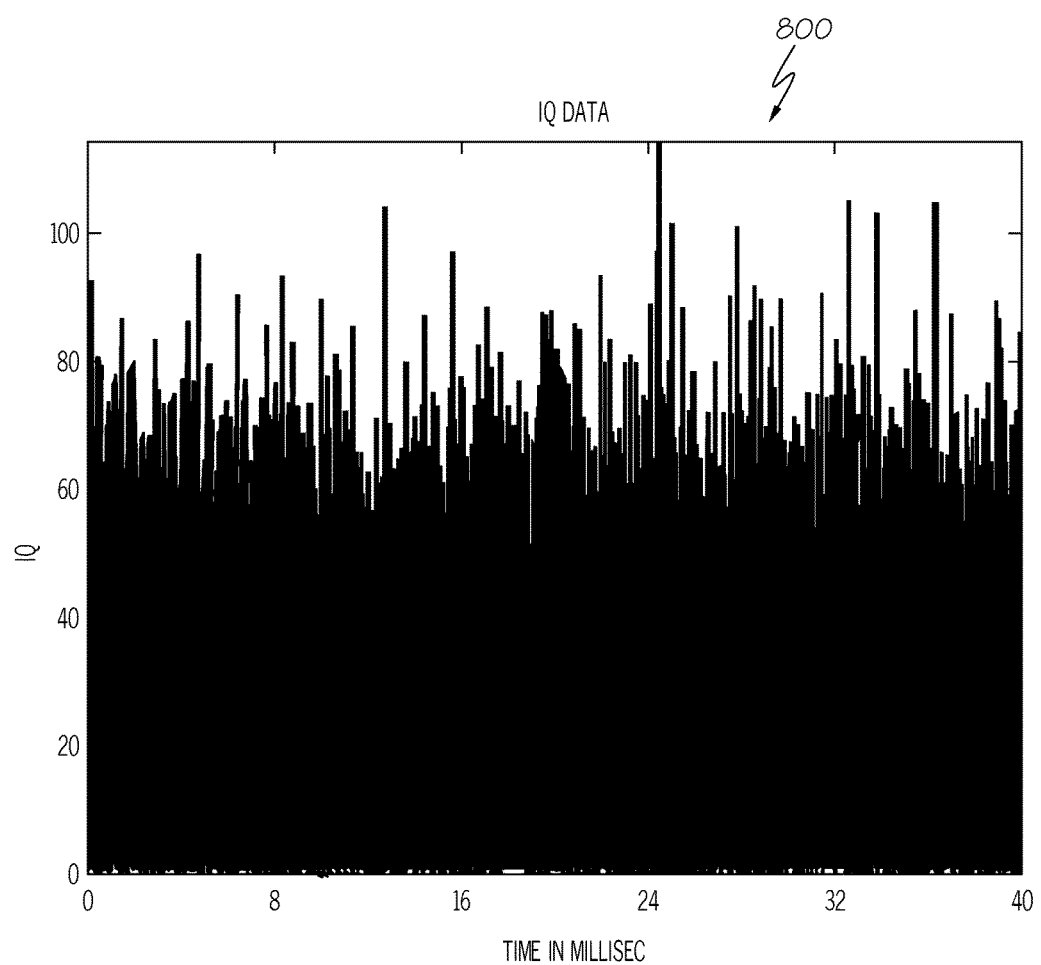
FIG. 8 is a representation of original digitized data from PRN signals received from a plurality of GPS satellites.

FIGS. 7A and 7B (collectively FIG. 7) are a flow chart of an exemplary method 700 for removing a spoofing signal from received signals in accordance with an embodiment of the present disclosure. The method 700 may be used for block 114 in FIG. 1. Referring also to FIG. 8, FIG. 8 is a representation of original digitized data (IQ data) 800 from navigation signals or C/A PRN signals received from a plurality of navigation satellites. As described with reference to block 102 in FIG. 1 a received RF signal or in this example a plurality of received navigation signals or GPS signals from various satellites or sources may be received. The plurality of signals may be sampled and stored as represented by the digitized IQ data 800 in FIG. 8. The navigation signal from each of the various satellites includes a unique navigation code or C/A PRN that corresponds to the particular satellite that transmitted the navigation signal. In block 702, a Doppler shift may be removed from each received RF signal. The Doppler shift may be determined from the attributes of the RF signal or navigation signal identified in block 106 of FIG. 1.

In block 704, the navigations signals or C/A PRN from each of the navigation or GPS satellites may be correlated. The navigation code or C/A PRN for each of the various satellites may be correlated by repeating an on-board replica of the navigation code or C/A PRN for each satellite a predetermined number of times. For example, the 1 millisecond on-board replica of the C/A PRN for each GPS satellite may be repeated 40 times to provide a 40 millisecond correlation waveform.

In block 706, a time lag of each received RF signal or navigation signal may be adjusted. The time lag of each signal may be determined from the attributes of the signal which were identified in block 106 of FIG. 1.

In block 708, a cancellation waveform for each spoofing signal may be generated. A cancellation waveform may be generated for a navigation code or C/A PRN of a particular navigation satellite that is being spoofed. For the navigation code or C/A PRN of a particular satellite that is being spoofed, the corresponding on-board replica of the navigation signal or C/A PRN in may be multiplied by a normalizing projection factor. Equation 5 represents the normalizing projection factor (Xnorm) and Equation 6 corresponds to the cancellation waveform (IQ_canc(t)) for removing a spoofing signal of a particular satellite navigation code or C/A PRN that is being spoofed from the received digitized signals:

$$X\text{norm}=x\text{corr0}(IQ,PRN)/x\text{corr0}(PRN,PRN) \quad \text{Equation 5}$$

$$IQ\_\text{canc}(t)=IQ(t)-X\text{norm}*PRN(t-t\text{lag}) \quad \text{Equation 6}$$

In equation 5, "xcorr0" is the zero-lag component of the correlation of the two waveforms, the particular satellite PRN on-board replica, and the IQ data 800 in FIG. 8 corresponding to the original noise-dominated waveform with the Doppler shift removed. In equation 6, "t" is the time variable and "tlag" aligns the subject navigation code or C/A PRN on-board replica for the particular satellite with the data waveform IQ 800. The cancellation waveform determined in block 708 corresponds to a replica of the spoofing signal.

Figure 9A:
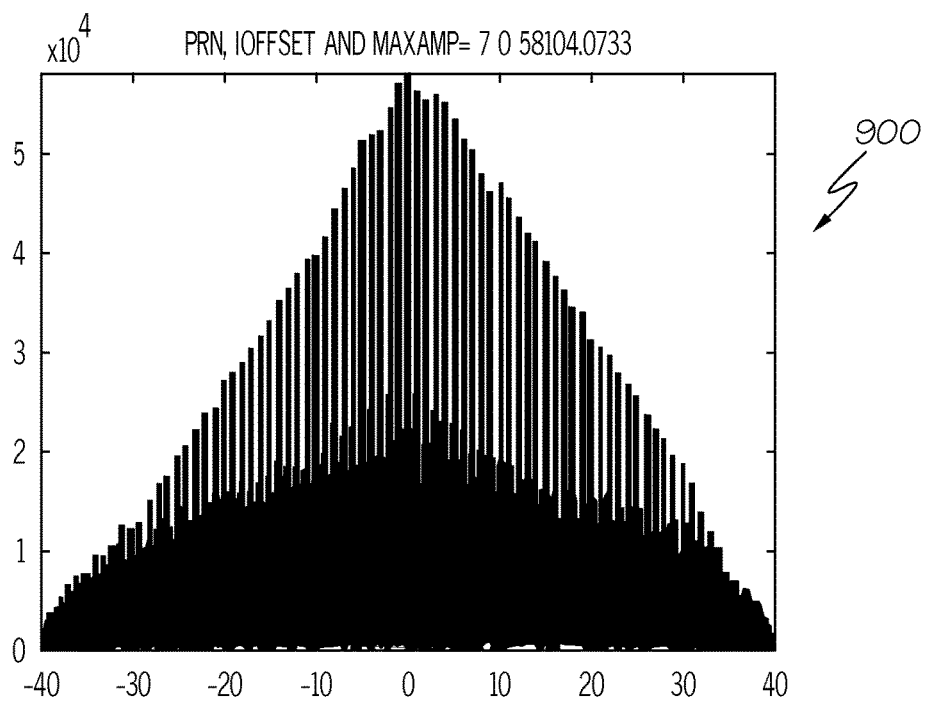
FIG. 9A is a representation of original digitized data of a spoofing signal corresponding to a navigation signal received from a particular navigation satellite extracted from the original digitized IQ data in FIG. 8 in accordance with an embodiment of the present disclosure.
Figure 9B:
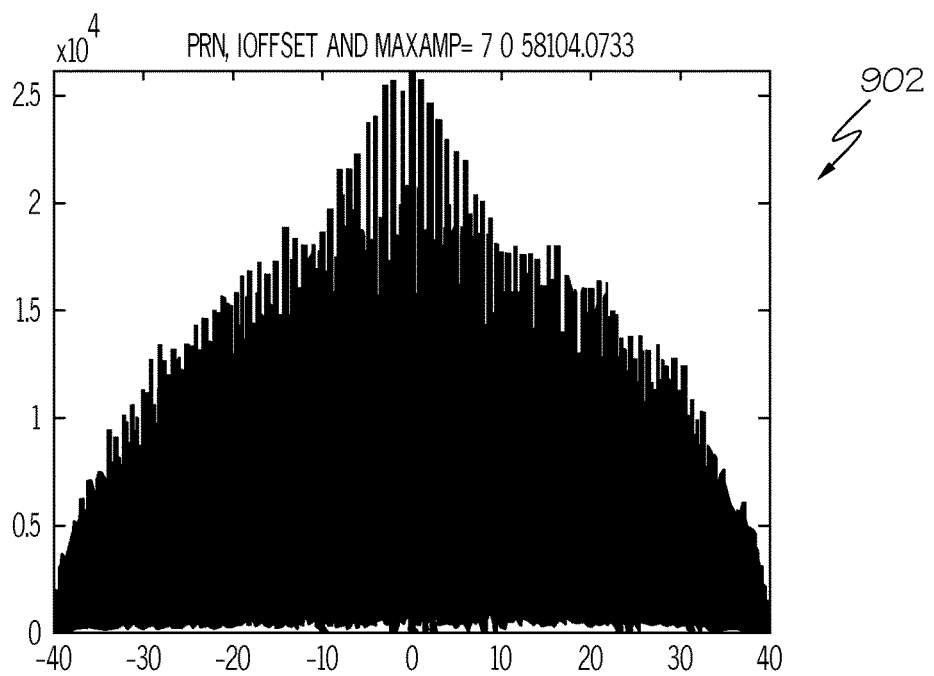
FIG. 9B is a representation of a residual non-spoofed signal of the original digitized IQ data in FIG. 8 with the digitized data of the spoofing signal in FIG. 9A removed in accordance with an embodiment of the present disclosure.

In block 710, a determination may be made if the magnitude or amplitude of the spoofing signal is known with sufficient precision. If the amplitude of the spoofing signal is known with sufficient precision, the method 700 may advance to block 712. In block 712, the replica signal corresponding to the spoofing signal or cancellation waveform may be subtracted from the received signal for the particular satellite or source. Referring also to FIGS. 9A and 9B, FIG. 9A is a representation of original digitized data of a spoofed signal 900 corresponding to a navigation or C/A PRN signal from a particular navigation satellite extracted from the original digitized IQ data 800 in FIG. 8 in accordance with an embodiment of the present disclosure. FIG. 9B is a representation of a residual non-spoofed signal 902 of the original digitized data IQ 800 in FIG. 8 with the digitized data of the spoofing signal 900 in FIG. 9A removed in accordance with an embodiment of the present disclosure.

If the magnitude of the spoofing signal is not known in block 710, the method 700 may advance to block 714. In block 714, an iterative process may be performed to remove the spoofing signal or spoofing signals until a cross-correlation of the lag in frequency shifted navigation signal or C/A PRN for the particular navigation satellite being spoofed is reduced to a level of correlation noise. The iterative process may include using a known process, such as a damped approach to the final solution, that may enable robustness in the presence of uncertainty of the spoofing signal strength.

In block 716, a determination may be made if there are residual spoofing signal components. If there are no remaining spoofing signal components in the processed digitized data resulting from the original data set 800, the method 700 may advance to block 718. In block 718, a residual non-spoofed signal may be presented to process for decoding similar to that described in block 116 of FIG. 1.

If there are residual spoofing signal components in block 716, the method 700 may advance to block 720. In block 720, the process similar to that previously described may be repeated to remove any remaining spoofing signals. Repeating the process to remove any remaining spoofing signals also removes larger amplitude multipath spoofing signals. Equation 7 is a normalized projection factor (Xnorm2) of a multipath spoofing signal. Equation 8 corresponds to a cancellation waveform (replica signal) for removing a multipath spoofing signal (IQ_dbl_canc(t)) for a navigation signal or C/A PRN of a particular satellite.

$$X\text{norm}2 = x\text{corr}0(IQ\_\text{canc}, PRN) / x\text{corr}0(PRN, PRN) \quad \text{Equation 7}$$

$$IQ\_dbl\_\text{canc}(t) = IQ\_\text{canc}(t) - X\text{norm}2 * PRN(t - tlag) \quad \text{Equation 8}$$

In equation 7 "xcorr0" is the zero-lag component of the correlation of the two waveforms for the particular satellite on-board replica and the IQ data 800 in FIG. 8 corresponding to the original noise-dominated waveform with the Doppler shift removed and spoofing signal subtracted. In equation 8, "t" is the time variable and "tlag" aligns the subject navigation signal or C/A PRN for the particular satellite with the data waveform IQ 800 with the spoofing signal subtracted.

Figure 9C:
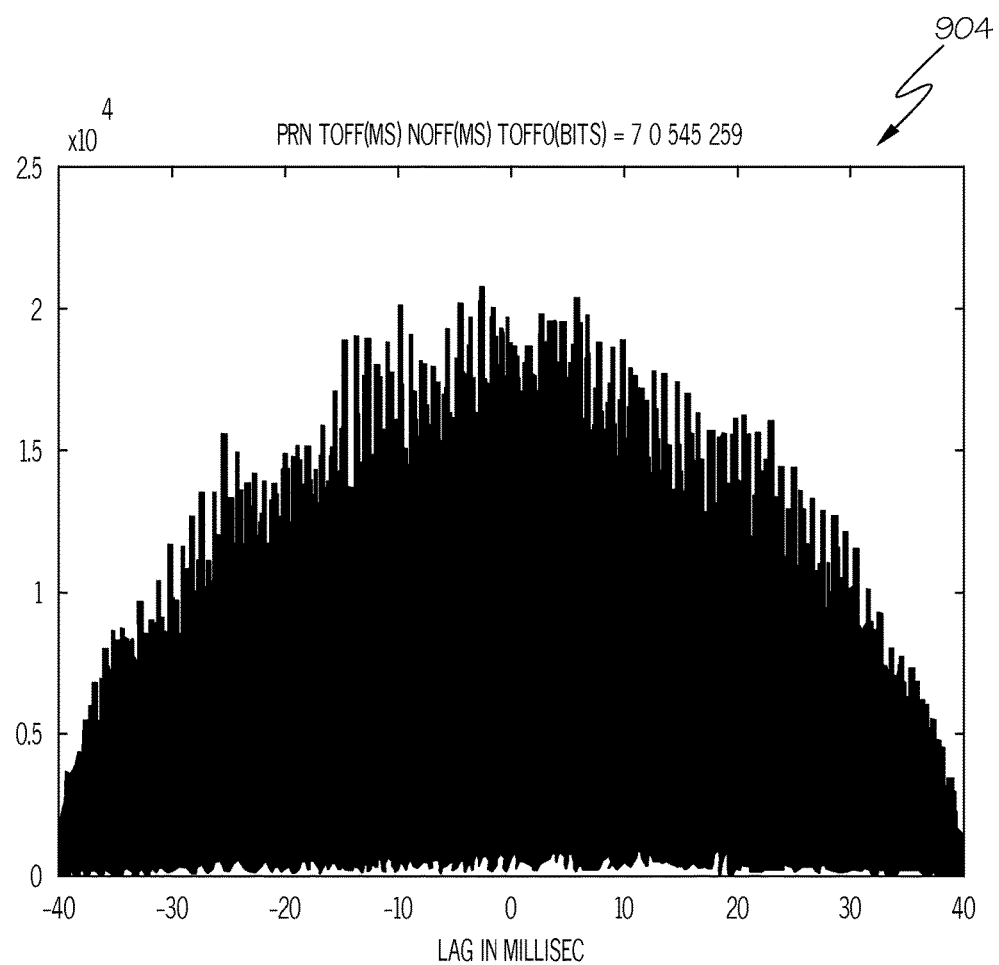
FIG. 9C is a representation of a residual non-spoofed signal of the original digitized IQ data in FIG. 8 with the digitized data of the spoofing signal and multipath signals in FIG. 9A removed in accordance with an embodiment of the present disclosure.

In block 722, the replica or cancellation waveform of each iteration is subtracted from the original digitized data 800 in FIG. 8 until there are no remaining spoofing signals or multipath spoofing signals in block 716. Referring also to FIG. 9C, FIG. 9C is a representation of a residual non-spoofed signal 904 of the original digitized IQ data 800 in FIG. 8 with the spoofing signal and multipath signals in FIG. 9A removed in accordance with an embodiment of the present disclosure, using equations 5 and 6, followed by application of equations 7 and 8.

Figure 10:
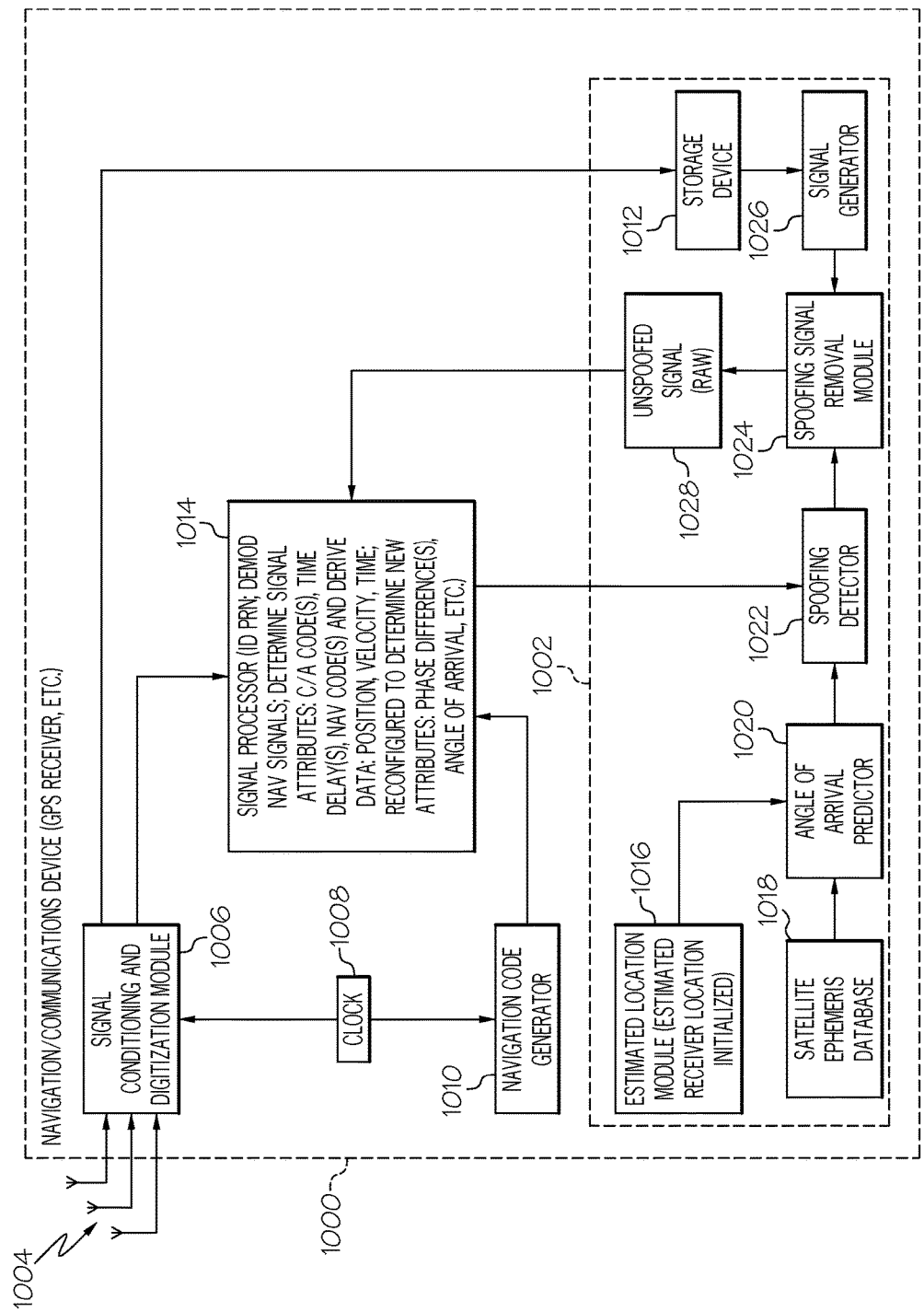
FIG. 10 is a block schematic diagram of an example of a navigation/communications device including a system of detecting and removing spoofing signals in accordance with an embodiment of the present disclosure.

FIG. 10 is a block schematic diagram of an example of a navigation/communications device 1000 including a system 1002 for detecting and removing spoofing signals in accordance with an embodiment of the present disclosure. The navigation/communications device 1000 may be any type of mobile navigation device, such as a GPS receiver, any type of mobile communications device, or any type of combination mobile navigation and communications device, such as a smart phone or other device that includes both navigation and communications capabilities. The methods 100 of FIG. 1, 500 of FIG. 5 and 700 of FIGS. 7A and 7B may be embodied in and performed by the device 1000. The device 1000 may include an array of antennas 1004 for receiving an RF signal or signals. The navigation/communications device 1000 may also include a signal conditioning and the digitization module 1006 that receives the RF signal or signals from the array of antennas 1004. The signal conditioning and digitization module 1006 may be configured to receive the RF signal or signals and condition and digitally sample or digitize the RF signal or signals. A signal stream from each antenna of the array of antennas 1004 may be separately conditioned and digitized and probed for satellite navigation codes or C/A PRN codes by the signal conditioning and digitization module 1006.

A clock 1008 may generate and provide clock pulses to the signal conditioning and digitization module 1006 and to a navigation code generator 1010. The navigation code generator 1010 may be configured to generate C/A PRNs. The clock pulse may be used for sampling or digitizing the received RF signal or signals. The clock pulses may also be used by the navigation code generator 1010 for generating navigation codes or C/A PRN codes that may correspond to digitized navigation satellite signals received by the array of antennas 1004 from a plurality of navigation satellites (not shown in FIG. 10) and digitized by the signal conditioning and digitization module 1006. Each of the plurality of navigation satellites may each be similar to the navigation satellite 602 in FIG. 6.

The conditioned and digitized signals from the signal conditioning and digitization module 1006 may be stored in a storage device 1012. The conditioned and digitized signals may be stored temporarily in the storage device 1012 in the event they may be needed for use in generating a replica signal or cancellation waveform for removing a spoofing signal similar to that described herein. If the signals stored in the storage device 1012 are not needed in removing a detected spoofing signal, the stored signals may be deleted once it is determined there are no spoofing signals or all spoofing signals have been removed from the received RF signals. The storage device 1012 may be a digital storage device. The storage device 1012 may be a component of the system 1002 for detecting and removing spoofing signals.

The navigation/communications device 1000 may also include a signal processor 1014 that may receive the conditioned and digitized signals from the signal conditioning and digitization module 1006. The signal processor 1014 may be configured to demodulate the signal stream from each antenna of the array of antennas 1004. The signal processor 1014 may also be configured to identify a set of attributes associated with each of the signal streams. Examples of the signal attributes that may be identified or determined for each received RF signal may include but is not necessary limited to a C/A PRN code, a navigation code and a time delay or lag of receipt of the signal corresponding to an offset between the received navigation code and the reference navigation code similar to that described with reference to FIG. 3C. In accordance with the present embodiment, an additional attribute that may be determined by the signal processor may be a phase difference based on the time delay or lag.

The signal processor 1014 may also be configured to derive data based on the signal attributes. Examples of derived data may include but is not necessarily limited to a position or location of the navigation satellite or source that transmitted the signal stream, a velocity of the navigation satellite or source that transmitted the signal or signal stream and a time at which the signal or signal stream was transmitted by the navigation satellite or source. In accordance with an embodiment of the present disclosure, additional derived data may include a derived angle of arrival of the received RF signal or signals. The derived angle of arrival may also be referred to as a measured angle of arrival ($\theta_{Measured}$) since the angle of arrival is determined or derived from attribute data associated with the RF signals received by the array of antennas 1004.

The system 1002 for detecting and removing spoofing signals may include an estimated location module 1016 and a database 1018 including satellite ephemeris data. The estimated location module 1016 may be configured to estimate a geographic location or position of the device 1000. The estimate location module 1016 may provide a best estimate location of the device 1000 using techniques, such as triangulation based on signals received from other sources which each have a fixed, known geographic location. Other techniques for estimating geographic location may also be used. The satellite ephemeris database 1018 may include a catalogue of ephemeris data for each navigation satellite or GPS satellite from which the device 1000 may receive signals.

The system 1002 for detecting and removing spoofing signals may also include an angle of arrival predictor 1020. The angle of arrival predictor 1020 may predict an angle of arrival ($\theta_{LOS}$) of each RF signal received by the device 1000 based on satellite ephemeris data from the database 1018 and an estimated location of the device 1000 from the estimated location module 1016.

The system 1002 for detecting and removing spoofing signals may also include a spoofing detector 1022. The spoofing detector 1022 may be configured to determine if a received RF signal is a spoofed or spoofing signal by comparing a derived or measured angle of arrival ($\theta_{LOS}$) from the signal processor 1014 and a predicted angle of arrival ($\theta_{LOS}$) from the angel of arrival predictor 1020. The spoofing detector 1022 may determine the presence of a spoofing signal using the method 500 of FIG. 5.

The system 1002 for detecting and removing spoofing signals may also include a spoofing signal removal module 1024. The spoofing signal removal module 1024 may be configured to digitally remove a spoofing signal from the conditioned and digitized RF signal or signals in response to the spoofing detector 1022 identifying that one of the received RF signals is or includes a spoofing signal. The spoofing signal removal module 1024 may remove the spoofing signal from the received conditioned and digitized RF signals similar to method 700 described with reference to FIGS. 7A and 7B. A signal generator 1026 may generate a copy or replica of the spoofing signal similar to that previously described based on the corresponding conditioned and digitized received RF signal stored in the storage device 1012. The copy or replica of the spoofing signal may then be subtracted digitally from the received signal by the spoofing removal module 1024. A residual non-spoofed signal 1028 may be fed back to the signal processor 1014 so that the actual, true received signal can be recovered and decoded or demodulated. The decoded or demodulated signal may be used to determine the geographic location of the device 1000 for navigation or other purposes.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for detecting and removing spoofing signals, comprising:
receiving, by a navigation or communications device, a radio frequency (RF) signal;
performing, by the navigation or communications device, an anti-spoofing assessment to detect a presence of a spoofing signal associated with the RF signal, the spoofing signal comprising a counterfeit signal corresponding to a navigation code sequence from a particular navigation satellite, wherein the spoofing signal is generated by a source other than the particular navigation satellite;
generating, by the navigation or communications device, a replica of the spoofing signal in response to the spoofing signal being detected;
subtracting, by the navigation or communications device, the replica of the spoofing signal from the RF signal to provide a residual non-spoofed signal; and
decoding, by the navigation or communications device, the residual non-spoofed signal.

2. The method of claim 1, wherein performing the anti-spoofing assessment comprises:
determining a measured angle of arrival of the RF signal by receiving the RF signal using an array of antennas;
determining a predicted angle of arrival of the RF signal based at least on a predicted location of a source of the RF signal relative to the navigation or communications device;
comparing the measured angle of arrival of the RF signal and the predicted angle of arrival of the RF signal; and
detecting the spoofing signal in response to the measured angle of arrival and the predicted angle of arrival not being approximately equal each other.

3. The method of claim 1, wherein performing the anti-spoofing assessment comprises:
determining a measured angle of arrival of the RF signal by using an array of antennas to receive the RF signal;
determining a predicted angle of arrival of the RF signal based on ephemeris data for a particular navigation satellite from which the RF signal is received;
comparing the measured angle of arrival of the RF signal and the predicted angle of arrival of the RF signal; and
detecting the spoofing signal in response to the measured angle of arrival and the predicted angle of arrival not being approximately equal each other.

4. The method of claim 1, wherein generating the replica of the spoofing signal comprises generating a cancellation waveform for the navigation code sequence of the particular navigation satellite.

5. The method of claim 4, wherein generating the cancellation waveform for the navigation code sequence of the particular navigation satellite comprises a product of an on-board replica of the navigation code sequence of the particular navigation satellite and a normalizing projection factor.

6. The method of claim 4, further comprising performing an iterative process to remove the spoofing signal in response to a magnitude of the spoofing signal not being known.

7. The method of claim 6, wherein performing the iterative process comprises performing the iterative process until a cross-correlation of a lagged and frequency shifted coarse acquisition pseudorandom noise code for the particular satellite is reduced to a level of correlation noise.

8. The method of claim 6, further comprising removing a multipath spoofing signal by performing the iterative process.

9. The method of claim 1, wherein receiving the RF signal comprises receiving a plurality of RF signals, each RF signal being received from a respective one of a plurality of GPS satellites, the method further comprising identifying a set of attributes of each RF signal, the set of attributes of each RF signal comprising a coarse acquisition pseudorandom noise code sequence (C/A PRN) for the respective one of the plurality of GPS satellites, a modulation for the C/A PRN, a time lag of the RF signal, and a Doppler shift of the RF signal.

10. The method of claim 9, wherein receiving the RF signal comprises receiving a plurality of RF signals, each RF signal being received from a respective one of a plurality of GPS satellites and each RF signal comprising a coarse acquisition pseudorandom noise code sequence (C/A PRN), and wherein generating the replica of the spoofing signal comprises:
removing the Doppler shift from each RF signal;
correlating the C/A PRNs from each of the plurality of GPS satellites;
adjusting the time lag of each RF signal;
generating a cancellation waveform for the spoofing signal, the spoofing signal being a counterfeit signal corresponding to the RF signal from a particular GPS satellite being spoofed, wherein the cancellation waveform for the spoofing signal comprises a product of an on-board replica of the C/A PRN of the particular GPS satellite being spoofed and a normalizing projection factor; and
performing an iterative process to remove any residual spoofing signal components and any spoofing signal multipath components.

11. A method for detecting and removing a spoofing signal, comprising:
receiving, by a navigation device, an RF signal from each of a plurality of navigation satellites, each RF signal comprising a navigation code;
performing, by the navigation device, an anti-spoofing assessment to detect a presence of a spoofing signal of at least one of the RF signals, the spoofing signal comprising a counterfeit signal corresponding to a navigation code sequence from a particular navigation satellite, wherein the spoofing signal is generated by a source other than the particular navigation satellite;
generating, by the navigation device, a replica of the spoofing signal in response to detecting the spoofing signal of at least one of the RF signals;
subtracting, by the navigation device, the replica of the spoofing signal from the RF signals received from each of the plurality of navigation satellites to provide a residual non-spoofed signal; and
decoding, by the navigation device, the residual non-spoofed signal.

12. The method of claim 11, wherein performing the anti-spoofing assessment comprises:

determining a measured angle of arrival of each RF signal by receiving the RF signals using an array of antennas;

determining a predicted angle of arrival of each RF signal based on ephemeris data for each satellite from which the RF signals are received;

comparing the measured angle of arrival of each RF signal and the predicted angle of arrival of each RF signal; and detecting the spoofing signal in response to the measured angle of arrival and the predicted angle of arrival not being approximately equal each other.

13. The method of claim 11, further comprising identifying a set of attributes associated with each RF signal received by the navigation device, the set of attributes associated with each RF signal comprising the navigation code, a modulation for the navigation code, a time lag of the RF signal, and a Doppler shift of the RF signal.

14. The method of claim 13, wherein generating the replica of the spoofing signal comprises:

removing the Doppler shift from each RF signal;

correlating the navigation code from each navigation satellite;

adjusting a time lag of each RF signal;

generating a cancellation waveform for the spoofing signal, the spoofing signal being a counterfeit signal corresponding to the RF signal from a particular navigation satellite being spoofed, wherein the cancellation waveform for the spoofing signal comprises a product of an on-board replica of the navigation code of the particular navigation satellite being spoofed and a normalizing projection factor; and performing an iterative process to remove any residual spoofing signal components and any multipath spoofing signals.

15. A navigation/communications device, comprising:

a signal conditioning and digitization module configured to receive an RF signal and condition and digitize the RF signal;

a signal processor for processing the digitized RF signal;

a spoofing detector configured for performing an anti-spoofing assessment to detect a presence of a spoofing signal associated with the digitized RF signal, the spoofing signal comprising a counterfeit signal corresponding to a navigation code sequence from a particular navigation satellite, wherein the spoofing signal is generated by a source other than the particular navigation satellite; and a spoofing signal removal module, wherein the spoofing signal removal module is configured to generate a replica of the spoofing signal in response to the spoofing signal being detected and to subtract the replica of the spoofing signal from the digitized RF signal to provide a residual non-spoofed signal, wherein the signal processor is further configured to decode the residual non-spoofed signal.

16. The navigation/communications device of claim 15, further comprising an array of antennas, the signal processor being further configured to determine a measured angle of arrival of the RF signal received by the array of antennas and the spoofing detector being further configured to perform a set of functions comprising:

determining a predicted angle of arrival of the RF signal based at least on a predicted location of a source of the RF signal relative to an estimated location of the navigation/communications device;

comparing the measured angle of arrival of the RF signal and the predicted angle of arrival of the RF signal; and detecting the spoofing signal in response to the measured angle of arrival and the predicted angle of arrival not being approximately equal each other.

17. The navigation/communications device of claim 16, wherein a plurality of RF signals are received by the signal conditioning and digitization module, each RF signal being received from a respective one of a plurality of navigation satellites and each RF signal comprising a navigation code sequence and wherein the predicted angle of arrival of each RF signal is predicted using at least ephemeris data for the respective one of the navigation satellites corresponding with each RF signal and the estimated location of the navigation/communications device.

18. The navigation/communications device of claim 17, wherein the signal processor is configured to identify a set of attributes associated with each RF signal, the set of attributes for each RF signal comprising the navigation code sequence, a modulation of the navigation code sequence, a time lag of the RF signal, and a Doppler shift of the RF signal.

19. The navigation/communications device of claim 18, wherein the signal removal module is further configured to perform a set of functions comprising:

removing the Doppler shift from each RF signal;

correlating the navigation code sequence from each navigation satellite;

adjusting a time lag of each RF signal; and generating a cancellation waveform for the spoofing signal, the spoofing signal being a counterfeit signal corresponding to the RF signal from a particular navigation satellite being spoofed, wherein the cancellation waveform for the spoofing signal comprises a product of an on-board replica of the navigation code sequence of the particular navigation satellite being spoofed and a normalizing projection factor.

20. The navigation/communications device of claim 19, wherein the signal removal module is further configured for performing an iterative process to remove any residual spoofing signal components and any multipath spoofing signals.

* * * * *